United States Patent
Taylor, II et al.

(10) Patent No.: US 10,349,087 B2
(45) Date of Patent: Jul. 9, 2019

(54) METHODS, SYSTEMS, AND COMPUTER READABLE MEDIA FOR RECONSTRUCTING IMAGES USING BLURRING AND NOISE-ENHANCED PIXEL INTENSITY RESAMPLING

(71) Applicant: The University of North Carolina at Chapel Hill, Chapel Hill, NC (US)

(72) Inventors: Russell Morton Taylor, II, Pittsboro, NC (US); Chong Shao, Chapel Hill, NC (US); Ketan Dasharath Mayer-Patel, Durham, NC (US)

(73) Assignee: THE UNIVERSITY OF NORTH CAROLINA AT CHAPEL HILL, Chapel Hill, NC (US)

( * ) Notice: Subject to any disclaimer, the term of this patent is extended or adjusted under 35 U.S.C. 154(b) by 0 days.

(21) Appl. No.: 16/035,016

(22) Filed: Jul. 13, 2018

(65) Prior Publication Data

US 2019/0020903 A1    Jan. 17, 2019

Related U.S. Application Data

(60) Provisional application No. 62/532,331, filed on Jul. 13, 2017.

(51) Int. Cl.
*H04N 19/86* (2014.01)
*G06T 5/00* (2006.01)
(Continued)

(52) U.S. Cl.
CPC ............ *H04N 19/86* (2014.11); *G06T 5/002* (2013.01); *G06T 5/20* (2013.01); *H04N 19/132* (2014.11);
(Continued)

(58) Field of Classification Search
CPC ...... H04N 19/132; H04N 19/17; H04N 19/82; H04N 19/85; G06T 5/002; G06T 5/20;
(Continued)

(56) References Cited

U.S. PATENT DOCUMENTS 5,390,133 A * 2/1995 Sohie .................... G01S 3/7865
342/159
6,021,227 A * 2/2000 Sapiro .................... H04N 1/417
358/426.02
(Continued)

OTHER PUBLICATIONS

Kang, Henry, and Seungyong Lee. "Shape-simplifying image abstraction." Computer Graphics Forum. vol. 27. No. 7. Oxford, UK: Blackwell Publishing Ltd, 2008. (Year: 2008).*
(Continued)

*Primary Examiner* — Bobbak Safaipour
(74) *Attorney, Agent, or Firm* — Jenkins, Wilson, Taylor & Hunt, P.A.

(57) ABSTRACT

Methods, systems, and non-transitory computer readable media for reconstructing electronic images using blurring and noise-enhanced pixel intensity resampling are disclosed. One method includes, at an image reconstructor including at least one processor, receiving an image compressed using an image compression algorithm. The method further includes decompressing the image using an image decompression algorithm. The method further includes modifying pixel intensities in the image by blurring and/or resampling the pixel intensities according to a noise distribution generated by the reconstructor without receiving a noise estimate from an image compressor. The method further includes outputting the image with the modified pixel intensities.

17 Claims, 5 Drawing Sheets
(3 of 5 Drawing Sheet(s) Filed in Color)

(51) Int. Cl.
  *G06T 5/20* (2006.01)
  *H04N 19/132* (2014.01)
  *H04N 19/154* (2014.01)
(52) U.S. Cl.
  CPC ............... *G06T 2207/10016* (2013.01); *G06T 2207/10024* (2013.01); *H04N 19/154* (2014.11)
(58) Field of Classification Search
  CPC .. G06T 9/00; G06T 7/11; G06T 7/174; G06K 9/40
  See application file for complete search history.

(56) References Cited

U.S. PATENT DOCUMENTS

| | | | | |
|---|---|---|---|---|
| 7,526,142 | B2* | 4/2009 | Sheraizin | G06T 5/002 348/699 |
| 9,247,129 | B1* | 1/2016 | Gray | G06T 7/11 |
| 2010/0027686 | A1* | 2/2010 | Zuo | G06T 9/00 375/240.29 |
| 2010/0092102 | A1* | 4/2010 | Sun | G06K 9/40 382/260 |
| 2012/0127360 | A1* | 5/2012 | Devaux | G03B 13/36 348/349 |
| 2016/0292589 | A1* | 10/2016 | Taylor, Jr. | G06F 16/1744 |
| 2016/0316097 | A1* | 10/2016 | Lineweber | G06F 17/211 |
| 2016/0371857 | A1 | 12/2016 | Brothers | |
| 2017/0295372 | A1* | 10/2017 | Lawrence | H04N 19/132 |
| 2018/0054630 | A1* | 2/2018 | Chang | H04N 19/91 |

OTHER PUBLICATIONS

Cribb et al., "A high throughput array microscope for the mechanical characterization of biomaterials," Review of Scientific Instruments, vol. 86, No. 2, pp. 1-12 (2015).

Shao et al., "Analysis-Preserving Video Microscopy Compression via Correlation and Mathematical Morphology", Microsc Res Tech, vol. 78, No. 12, pp. 1-19 (Dec. 2015).

Mukherjee et al., "The latest open-source video codec VP9—an overview and preliminary results," In Picture Coding Symposium (PCS), pp. 390-393 (Dec. 2013).

Chao et al., "On the design of a novel JPEG quantization table for improved feature detection performance," In Image Processing (ICIP), 2013 20th IEEE International Conference on, pp. 1675-1679 (Sep. 2013).

Chao et al., "SIFT feature-preserving bit allocation for H. 264/AVC video compression," In Image Processing (ICIP), 2012 19th IEEE International Conference on, pp. 1-4 (Sep. 2012).

Grois et al., "Advances in Region-of-Interest video and image processing," Multimedia Networking and Coding, pp. 1-44 (2012).

Monnier et al., "Bayesian approach to MSD-based analysis of particle motion in live cells," .Biophysical Journal, vol. 103, No. 3, pp. 616-626 (2012).

Sullivan et al., "Overview of the high efficiency video coding (HEVC) standard," Circuits and Systems for Video Technology, IEEE Transactions on, vol. 22, No. 12, pp. 1649-1668 (2012).

Korshunov et al., "Video quality for face detection, recognition, and tracking," ACM Transactions on Multimedia Computing, Communications, and Applications (TOMM), vol. 7, No. 3, pp. 1-21 (2011).

Meuel et al., "Low bit rate ROI based video coding for HDTV aerial surveillance video sequences," In Computer Vision and Pattern Recognition Workshops (CVPRW), 2011 IEEE Computer Society Conference on, pp. 13-20 (Jun. 2011).

Chao et al., "Preserving SIFT features in JPEG-encoded images," In Image Processing (ICIP), 2011 18th IEEE International Conference on, pp. 301-304 (Sep. 2011).

Liu et al., "Region-of-interest based resource allocation for conversational video communication of H. 264/AVC," IEEE transactions on circuits and systems for video technology, vol. 18, No. 1, pp. 134-139 (2008).

Van Leuven et al., "An implementation of multiple region-of-interest models in H. 264/AVC," In Signal Processing for Image Enhancement and Multimedia Processing pp. 502-511 (2008).

Bernas et al., "Compression of fluorescence microscopy images based on the signal-to-noise estimation," Microsc. Res. Tech., vol. 69, pp. 1-9 (2006).

Amer et al., "Fast and reliable structure-oriented video noise estimation," Circuits and Systems for Video Technology, IEEE Transactions on, vol. 15, No. 1, pp. 113-118 (2005).

Daly et al., "Bit-depth extension using spatiotemporal microdither based on models of the equivalent input noise of the visual system," In Color Imaging VIII: Processing, Hardcopy, and Applications, vol. 5008 of SPIE, pp. 455-466 (2003).

JVT, "Draft ITU-T recommendation and final draft international standard of joint video specification (ITU-T rec. H.264-ISO/IEC 14496-10 AVC)," pp. 1-264 (Mar. 2003).

Menser et al., "Face detection and tracking for video coding applications," In Signals, Systems and Computers, 2000. Conference Record of the Thirty-Fourth Asilomar Conference on, vol. 1, pp. 1-5 (Oct. 2000).

Nowak et al., "Wavelet-domain filtering for photon imaging systems," IEEE Transactions on Image Processing, vol. 8, No. 5, pp. 666-678 (1999).

"Video Spot Tracker Manual," Computer Integrated Systems for Microscopy and Manipulation, http://cismm.cs.unc.edu/resources/software-manuals/video-spot-tracker-manual/, pp. 1-36 (2018).

* cited by examiner

METHODS, SYSTEMS, AND COMPUTER READABLE MEDIA FOR RECONSTRUCTING IMAGES USING BLURRING AND NOISE-ENHANCED PIXEL INTENSITY RESAMPLING

PRIORITY CLAIM

This application claims the priority benefit of U.S. Provisional Patent Application Ser. No. 62/532,331, filed Jul. 13, 2018, the disclosure of which is incorporated herein by reference in its entirety.

GOVERNMENT INTEREST

This invention was made with government support under Grant No. 5-P41-EB002025-27 awarded by the National Institutes of Health. The government has certain rights in the invention.

TECHNICAL FIELD

The subject matter described herein relates to improving quality of compressed image reconstruction. More particularly, the subject matter described herein relates to methods, systems, and computer readable media for reconstructing compressed images using noise enhanced pixel intensity reconstruction.

BACKGROUND

Video images are often compressed for storage and/or transmission over computer networks. The images must be decompressed before the images can be viewed or analyzed. The process of compressing and decompressing images can introduce undesirable artifacts, such as blocks or banding, in the decompressed image. Efforts to reduce blocks or banding in decompressed images rely on analysis of the noise produced during compression, communicating an estimate of the compression noise to the decompressor, and using the estimate to perform decompression and reduce the undesirable artifacts. While such methods may be effective, they require additional computation during image compression and are thus not suitable for scalable deployment, especially since standardized image compression algorithms, such as H.264 are widely deployed and would require modification to support communication of compression noise from the compressor to the decompressor.

Accordingly, there exists a need for improved methods, systems, and computer readable media for performing image reconstruction without requiring an estimate of actual compression noise to be obtained from the image compressor.

SUMMARY

Methods, systems, and non-transitory computer readable media for reconstructing electronic images using noise-enhanced pixel intensity resampling are disclosed. One method includes, at an image reconstructor including at least one processor, receiving an image compressed using an image compression algorithm. The method further includes decompressing the image using an image decompression algorithm. The method further includes modifying pixel intensities in the image by blurring and resampling the pixel intensities according to a noise distribution generated by the reconstructor without receiving a noise estimate from an image compressor. The method further includes outputting the image with the modified pixel intensities.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The subject matter described herein will now be explained with reference to the accompanying drawings of which.

DETAILED DESCRIPTION

Figure 1:
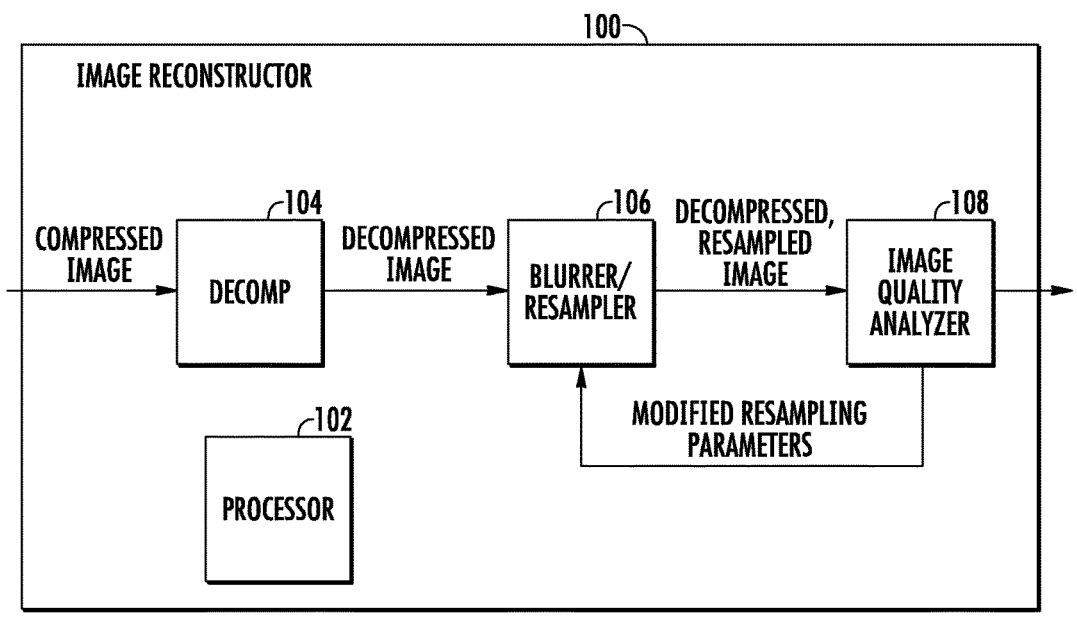
FIG. 1 is a block diagram illustrating an exemplary image reconstructor for image reconstruction using blurring and/or noise-enhanced pixel intensity resampling.

Methods, systems, and non-transitory computer readable media for reconstructing electronic images using noise-enhanced pixel intensity resampling are disclosed. FIG. 1 illustrates an example of an image reconstructor according to an aspect of the subject matter described herein. Referring to FIG. 1, an image reconstructor 100 includes at least one processor 102. Image reconstructor 100 further includes an image decompressor 104, a blurrer/resampler 106 and an image quality analyzer 108, any or all of which may be implemented by processor 102.

Image decompressor 104 is configured to receive an image compressed using an image compression algorithm, such as JPEG or H.264, and to decompress the image using an image decompression algorithm that is the inverse of the image compression algorithm. For example, if H.264 or JPEG image compression is used, the inverse of the H.264 or JPEG image compression algorithm may be used to decompress the image. Blurrer/resampler 106 is configured to modify pixel intensities in the image by resampling the pixel intensities according to blurring and a noise distribution generated by blurrer/resampler 106 without receiving a noise estimate from an image compressor. The resulting output image generated by blurrer/resampler 106 may be analyzed by image quality analyzer 108 for the presences of banding, blockiness, or other undesirable visual artifacts. If such artifacts are present or of the level of such artifacts exceeds a threshold, image quality analyzer 108 may modify the resampling parameters, communicate the modified resampling parameters to blurrer/resampler 106, and blurrer/resampler 106 may resample the image with the modified resampling parameters. The image resampling and quality analysis may be repeated until the presence undesirable visual artifacts is below an acceptable threshold. Blurrer/resampler 106 may also make use of information from the decompressor regarding the compression parameters used to encode the image to determine the blurring, noise, and resampling to perform.

One way to view this approach is that it replaces a specific and incorrect reconstruction from an incomplete representation of an image with a reconstruction that respects the uncertainty in the underlying representation. There are several ways that this might be accomplished using a single parameter per image or video stream, some of which follow:

1. Provide a single parameter describing the amount of noise expected in the intensity and color for each pixel in the representation and use this to construct a distribution from which the actual color of the image is sampled.
   a. One such parameterization would be to specify a scale factor representing the number of photons per intensity count in the image and then sampling from a Poisson distribution separately for the red, green, and blue color of each pixel where the scale factor maps the display intensity counts to and from photons. For example, if the pixel intensity counts for red, green, and blue for a given pixel are 3, 2, and 7 on a scale of 0-7, and the scale factor is 100; this may correspond to photon counts of 300, 200, and 700, image blurrer/resampler 106 may select from Poisson distributions with expected values 300, 200 and 700. The sampled values (perhaps 280, 201 and 698) would then be scaled back down by an inverse of the scale factor to produce new red, green and blue pixel intensity values; in this case 2, 2, and 6, if the value of the hundreds place after down scaling is used to select the re-sampled pixel intensity values.
   b. Another parameterization that may be applied by blurrer/resampler 106 is to specify the width of a Gaussian in intensity counts and then sample separately from this distribution a pixel intensity value to be added or subtracted from each of the red, green, and blue colors in the image. For example, if the width of the Gaussian is set to 4, with 0 being the expected value, and the pixel intensity counts for red, green, and blue for a pixel are 1, 4, and 6 before resampling, blurrer/resampler 106 may select a value from the Gaussian distribution to add to the intensity count for each color. In this example, assume the selections result in 2, −1, and 3. The resampled intensity counts would be 3, 2, and 9 for red, green and blue. It is possible that the blue intensity value of 9 may be above the maximum range of 3 bits are being used to represent pixel intensities. In such a case, the pixel intensity may be set to the maximum possible value in the range (7 for 3 bits) or the intensity may be resampled.
   c. Another parameterization that may be applied by blurrer/resampler 106 is to specify the width in intensity counts of a uniform distribution and then sample and add this to the red, green, and blue counts for each pixel. If the width of the distribution is 4, and the minimum value is 0, then blurrer/resampler 106 may, in one example, select 2, 2, and 1. If the intensity counts for red, green, and blue for a given pixel are 3, 2, and 1, the resampled values in this example will be 5, 4, and 2.
   d. Another parameterization that may be implemented by blurrer/resampler 106 is specify the width of a Gaussian centered around 1 and then multiply each color of a pixel by a factor that is a sampling from this distribution. For example, blurrer/resampler 106 may select values of 1.2, 0.8, and 1 from the distribution. If the original pixel intensity values for red, green, and blue are 1, 3, and 3, the resampled values would be 1.2, 2.4, and 3.

2. In another example, blurrer/resampler 106 may utilize a single parameter describing the expected size of the smallest correctly-represented features in the image and blur the resulting image using a Gaussian whose width is scaled by this smallest expected-correct feature. For example, if the expected size of the smallest correctly represented feature is 4×4 pixels, blurrer/resampler 106 may convolve the neighboring pixels with a Gaussian with a standard deviation of 2 pixels. For images with sparse parameterizations, one might expect the resulting features to be larger than the macroblocks (16×16 pixels for JPEG and other techniques), requiring blurring that is as large or larger than the macroblock size to reduce the sharp-boundary artifacts between macroblocks.

3. In another example, blurrer/resampler 106 may utilize a single parameter describing the expected spatial extent of the smallest properly-encoded feature in the image and reconstruct a given pixel by sampling from the distribution of specific colors that would be assigned by existing algorithms to a neighboring pixel that is within this distance. The resulting spatial sampling distribution could be from a Gaussian centered at the pixel, from a uniform square centered at the pixel, or from some other spatial distribution (see FIG. 3). For example, if the expected spatial extent of the smallest properly encoded feature is 4 pixels in each direction, blurrer/resampler 106 may sample from a Gaussian distribution with a standard deviation of 4 to determine how far to go in each spatial direction to select a neighbor whose pixel intensities are to be used as the intensities for the current pixel.

Blurrer/resampler 106 may apply the above-described techniques separately or in any combination, either orthogonally from each other or sequentially (for example, the resampling in 3 could come from a combination of the distributions described in 1 rather than from those of standard algorithms).

Examples

Figure 2A:
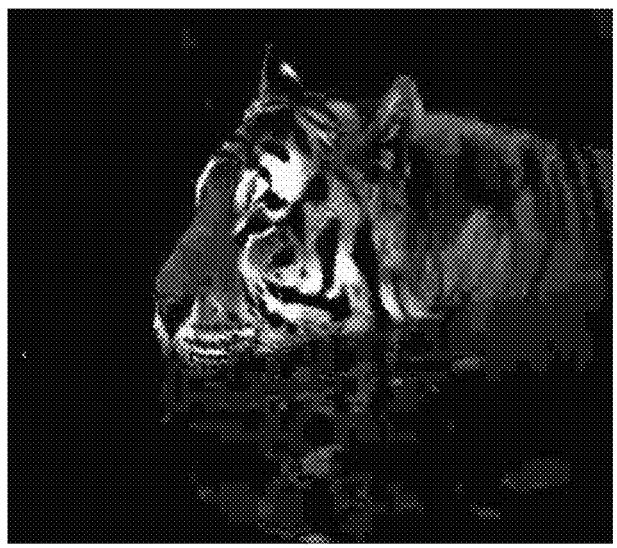
FIGS. 2A-2E are images illustrating results pixel intensity resampling according to the subject matter described herein.

An example of the simplest of these techniques applied to a highly-compressed image of a swimming tiger follows. FIG. 2A is the standard reconstruction from a JPEG image with quality-factor 5. It is equivalent to heavily-compressed streaming network video and shows both block reconstruction from undersampled macroblocks (see the sharp vertical and horizontal boundaries in the brown area between the nose and eyes) and some banding (see the lighter brown regions along the waterline halfway between the ear and the right edge of the image).

Figure 2B:

Additive brightness noise reduces both artifacts, as seen in FIG. 2B. The presence of noise is clearly seen in the image, but is not as objectionable as the artifacts it replaces because of several things, including (1) it does not excite the edge-detection machinery present in the early visual system, and (2) it is more like the noise expected in real images because it matches the impact of low-light photography.

Figure 2C:
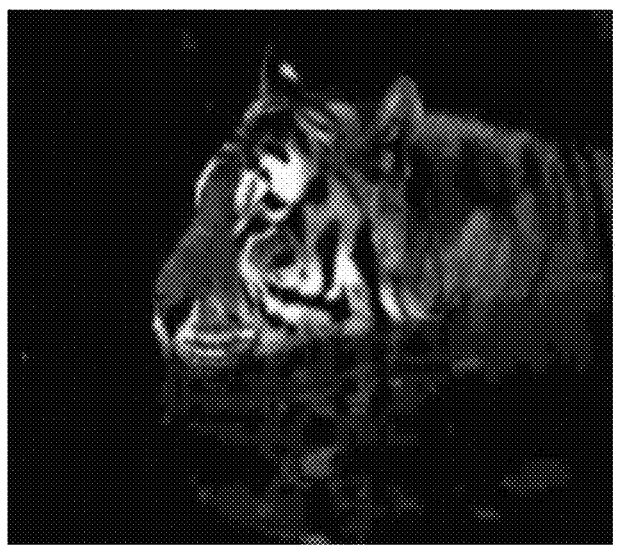

FIG. 2C shows the impact of uniform Gaussian blurring applied after the additive noise. This greatly reduces the visibility of the additive noise and further increases the visual quality of the image. It somewhat reduces the sharp edges on the reflected light patches in the water, which the additive noise alone did not.

Figure 2D:
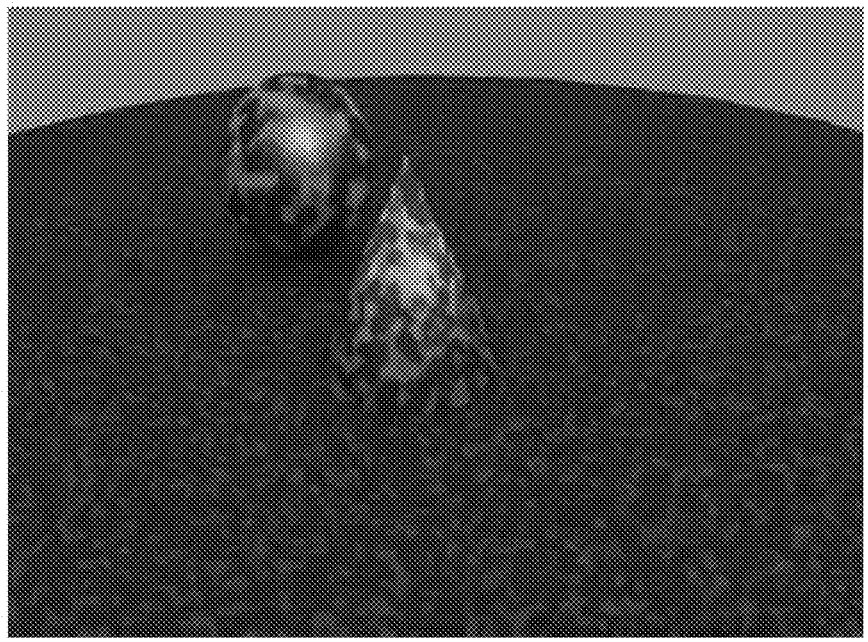
Figure 2E:
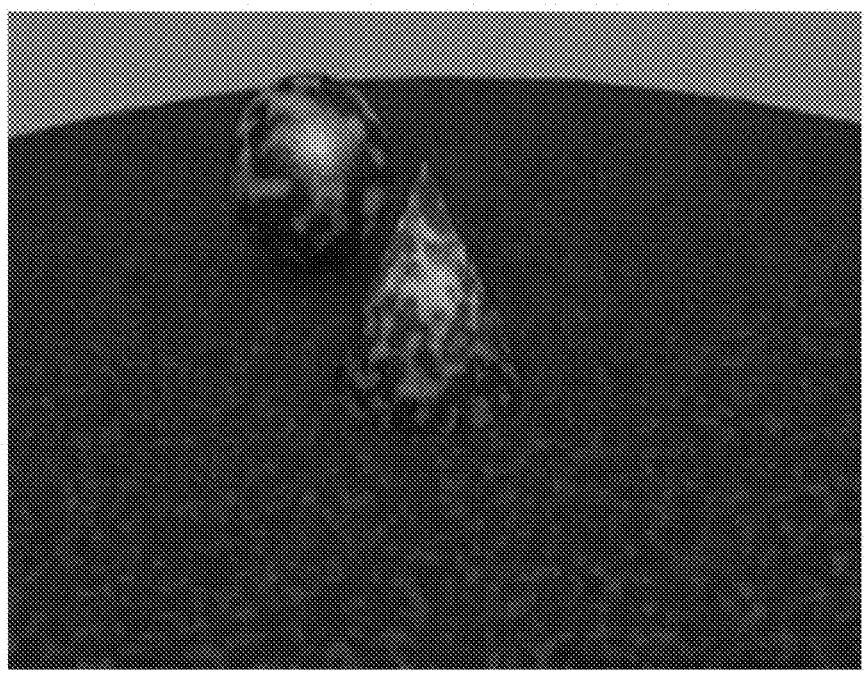

FIGS. 2D and 2E are images of a frame from a video that runs at 60 fps when doing both standard (FIG. 2D) and properly-sampled (FIG. 2E) decompression (implemented by modifying the color-conversion kernel of the standard nVidia decoding pipeline). Blockiness caused by compression seen in the back of the ground plane and in the lighting highlights is removed by proper resampling.

Adaptive Approaches

The above approaches proceed without any knowledge of the image encoding, and they operate completely on the reconstructed image. Some image-compression algorithms change the amount of information across macroblocks in the image based on the amount of change present within a given macroblock. Some locations, particularly edges in the image, may have a more-faithful representation than regions with slowly-varying color. Any of the above approaches can be augmented to adapt to this change in information across the image by making use of the differences in encoding across the image to adjust their parameterizations.

Different macroblocks would therefore have different amount of adjustment. For example, in regions where only low-spatial-frequency information is present, the reconstruction could add more blurring than in regions that have higher spatial-frequency information. For another example, a video encoded with high fidelity in foreground regions and low fidelity in background regions might have no added noise, blurring or resampling in foreground regions but a lot of adjustment in background regions.

Some compression techniques reduce the number of bits to encode color (in red, green, blue (RGB) space, luminance, chrominance (YUV), or other spaces), meaning that there are fewer representable colors. Although current reconstruction approaches select the exact color in the representation, the representation actually describes a range of colors that would all be represented the same way. This new approach can take direct advantage of this per-block encoding information to adjust the range of colors selected from, sampling from a uniform distribution of values within each pixel rather than using the specific encoding value. (See FIG. 4.) Note that information about the encoding of each macroblock is stored in the encoded image itself and does not require additional knowledge about the encoded image or measurement of its noise characteristics.

Macroblock Boundaries

Of particular interest are brightness discontinuities that occur at macroblock boundaries. These form the sharp horizontal and vertical boundaries seen in FIG. 2A, both in regions of fast image brightness variation (where they appear as blockiness) and in regions of slow image brightness variation (where they appear as banding).

These macroblock boundaries often do not correspond with image boundaries (they occur in camera space, not in the world space that is being sampled). These boundaries are a particularly distracting artifact, both in image and in video reconstructions.

When brightness discontinuity appears at a macroblock boundary:

1. An adaptive approach can determine whether the representation on both sides of the boundary is sufficient to accurately describe such a discontinuity (if it has both high enough spatial frequency and sufficient brightness encoding). If so, it can leave the boundary unadjusted. If not, it can blur and/or resample across the boundary and thus reduce the perceptual impact of artifactual boundaries. In non-adaptive approaches, the amount of blurring and resampling is the same across the entire image and would be selected to provide the most visually-pleasing results.

2. The discontinuity across the macroblock boundary can be adjusted by blurring pixels near and at the boundary, by allowing resampling to occur across the boundary, by increasing the brightness noise applied near the boundary, or by other methods or combinations of methods.

Video

For reconstruction of video data, the noise sampling and/or spatial resampling would be done independently for each frame, to avoid introducing a strong temporal signature for the noise pattern itself. This corresponds to the per-pixel noise variation seen in low-lighting video situations.

Implementation

The techniques described above can be implemented as a post-process to image reconstruction, perhaps as part of the conversion from YUV to RGB space that occurs before rendering. They can be applied in software on a central processing unit, on custom hardware, or within graphics-processor routines so that they can occur at full video rate. The complexity of these routines is less than that of JPEG or H.264 decoding, so it might add negligible cost to a system.

Figure 3:
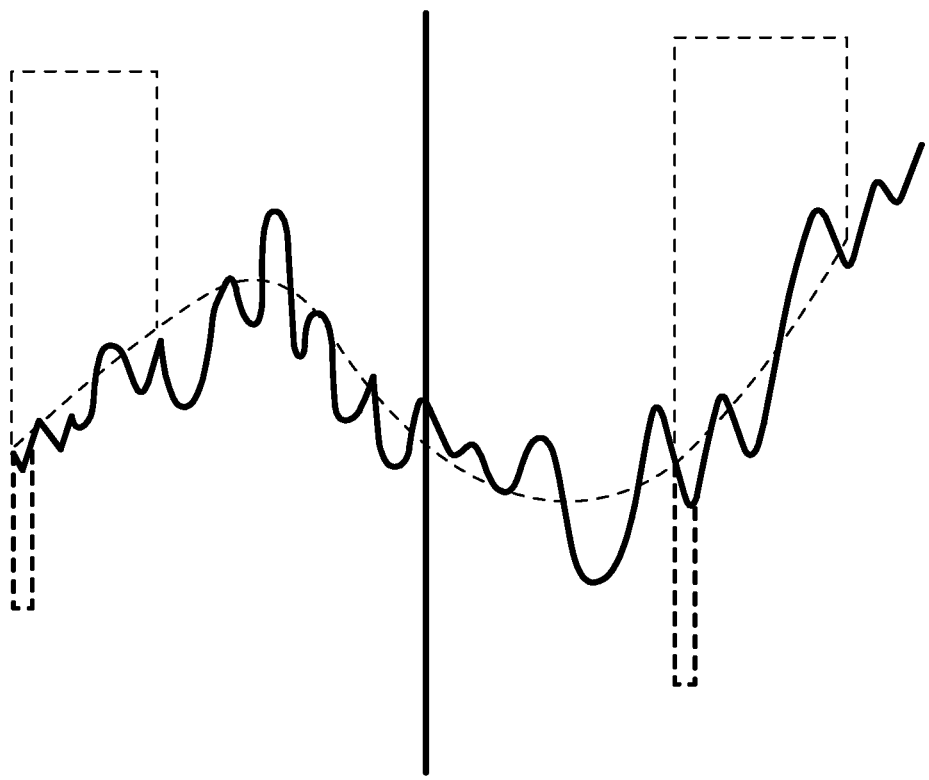
FIG. 3 is a graph illustrating spatial resampling of pixel intensity values using intensities of neighboring pixels.

FIG. 3 shows the sampling of the same function at to different scales, and shows samples crossing a macroblock boundary (the vertical line). The curvier black line shows a sampling of the signal that includes terms at both low and high spatial frequencies, while the smoother green dashed line includes only lower spatial frequencies. The wider green bars at the top show a spatial scale corresponding to the highest frequency that can be captured by the low-frequency reconstruction, and the narrower black bars near the bottom show the finer scale that can be captured by the high-frequency sampling. The vertical dashed lines show the boundaries of the regions on the curve that are sampled by each bar. When approach 3 (spatial sampling of neighboring pixels) is being used, the pixel intensity at the center of each bar would be chosen from intensities that cover the vertical range of the curve encompassed by the dashed lines. In both cases, the ranges of intensities available for the green curve are larger than those available for the black curve.

For adaptive approaches, the width of the region would be adjusted based on the spatial frequencies that can be captured by the underlying representation.

Figure 4:
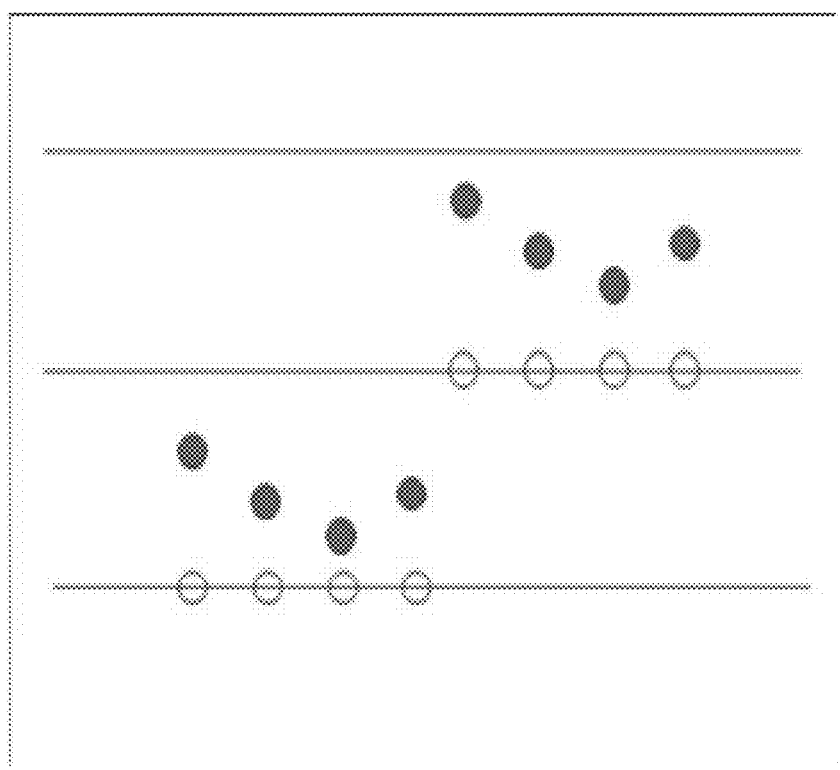
FIG. 4 is a representation of pixel intensity resampling between pixel intensity steps.

FIG. 4 shows a representation of colors with high bit count (dark points) and a representation with low bit count (open points). The open points are restricted to a much coarser set of locations than the dark points, and they actually represent a range from one of the ruler lines to the next-highest one. All of the high-bit-count points for each set of four lie within the same region, thus they have the same representation in the wider spacing represented by the open points. Thus, any location between the pair of ruler lines (which represent intensity counts or values that must be assigned to each point or pixel) is as good as any other for colors represented by the open points, and the new approach can select a random location within each band rather than choosing the color that is exactly at the open point.

According to another aspect of the subject matter described herein, pixels may be re-sampled temporally across video frames occurring at different times to reduce the perception of jitter in low frame rate video. For example, image reconstructor 100 illustrated in FIG. 1 may receive low frame rate video frames (e.g., between 5 and 10 frames per second). Decompressor 104 may decompress the video frames using the inverse of the video compression algorithm used to compress the video frames. As with the other re-sampling techniques described herein, blurrer/resampler 106 may apply blurring and/or resampling to the pixel intensities to each image frame being reconstructed according to a noise distribution generated by the image reconstructor without receiving a noise estimate from an image compressor to reduce blockiness in each reconstructed image caused by the image compression and decompression algorithm.

After applying the blurring or resampling to reduce the video compression/decompression artifacts in each video frame, blurrer/resampler 106 may, for a video frame being reconstructed, select each pixel intensity value to display in the current frame based on either the pixel intensity value for the current frame or the pixel intensity value for the previous frame using a probability distribution that changes over time. Using such a technique causes the pixels to move from one frame to the next at a time that is independent of the times that the other pixels move. The result is a random-appearing cross-fade from one frame to the next, rather than a spatially non-uniform fade, such as a horizontal or vertical wiping away of one image and replacing with the new image.

Thus, in one example of the subject matter described herein, an image reconstructor includes at least one processor and may further include an image decompressor for receiving an image compressed using an image compression algorithm and decompressing the image using an image decompression algorithm; and a pixel intensity blurrer/resampler for modifying pixel intensities in the image by blurring and/or resampling the pixel intensities according to a noise distribution generated by the reconstructor without receiving a noise estimate from an image compressor and outputting the image with the modified pixel intensities. In this example, the image is a first image in a sequence of video frames. The image reconstructor receives a second image in the sequence of video frames and compressed using the image compression algorithm. The image decompressor decompresses the second image using the image decompression algorithm. The pixel intensity blurrer/resampler modifies pixel intensities in the second image by blurring and/or resampling the pixel intensities according to a noise distribution generated by the reconstructor without receiving a noise estimate from an image compressor. The pixel intensity blurrer/resampler selects, for each pixel position in the second image, a pixel intensity for the pixel position in the first image or a pixel intensity for the pixel position in the second image using a probability distribution that varies over time.

The subject matter described herein includes a new technique for image and video decompression that respects intensity and spatial uncertainty in the encoded stream to significantly improve the perceived quality of final image or video output. This technique avoids spatial and intensity thresholding artifacts by adding noise and spatial blurring into the data stream during the decompression process; these decrease banding and block artifacts that commonly occur upon image reconstruction and detract from overall image quality. The method runs at full video rate on a commodity GPU and is particularly well suited for improving the user experience on high resolution cell phones, televisions, and computers where users commonly stream highly-compressed images or videos that are not well matched to the screen resolution of their device.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for reconstructing an electronic image using blurring and noise-enhanced pixel resampling, the method comprising:
    at an image reconstructor including a decompressor, a blurrer/resampler, and
    an image quality analyzer, and at least one processor:
        receiving, at the decompressor, an image compressed using an image compression algorithm;
        decompressing, by the decompressor, the image using an image decompression algorithm and producing a decompressed image;
        analyzing, by the image quality analyzer, the decompressed image for blockiness or banding and detecting blockiness or banding in the decompressed image;
        modifying, by the blurrer/resampler, pixel intensities in the decompressed image by selecting new pixel intensity values using a noise distribution generated by the reconstructor without receiving a noise estimate from an image compressor and thereby producing a decompressed image with modified pixel intensities and less blockiness or banding than the decompressed image produced by the decompressor; and
        outputting, by the blurrer/resampler, the decompressed image with the modified pixel intensities and less blockiness or banding than the decompressed image produced by the decompressor.

2. The method of claim 1 modifying the pixel intensities includes, at the reconstructor, using a parameter representing an amount of noise expected in the pixel intensities to construct the noise distribution.

3. The method of claim 2 wherein the parameter comprises a scale factor representing a number of photons per pixel intensity count and wherein selecting new values for the pixel intensities includes selecting a scale factor to apply to each pixel intensity before sampling from a Poisson distribution separately for red, green, and blue intensities for each pixel and then re-scaling by the inverse of the scale factor to produce new pixel intensities.

4. The method of claim 2 wherein the parameter is a width of a Gaussian distribution in pixel intensity counts and wherein selecting new values for the pixel intensities includes sampling pixel intensity counts from the Gaussian distribution and adding or subtracting the pixel intensity counts from the pixel intensities in the decompressed image.

5. The method of claim 2 wherein the parameter is a width of a Gaussian distribution centered around 1 and wherein selecting new values for the pixel intensities includes sampling values from the Gaussian and multiplying sampled values by the pixel intensities in the decompressed image.

6. The method of claim 1 wherein selecting new values for the pixel intensities includes blurring the image using a Gaussian distribution having a width scaled by a parameter representing an expected size of a smallest correctly represented feature in the decompressed image.

7. The method of claim 2 wherein the parameter represents an expected spatial extent of a smallest properly-encoded feature in the image and wherein selecting new values for the pixel intensities includes sampling values from the pixel intensities from neighboring pixels using a spatial sampling distribution centered at each pixel and scaled according the parameter.

8. The method of claim 1 wherein the image is a first image in a sequence of video frames and wherein the method further comprises:
receiving a second image in the sequence of video frames and compressed using the image compression algorithm;
decompressing the second image using the image decompression algorithm to produce a second decompressed image;
modifying pixel intensities in the second decompressed image by selecting new values for the pixel intensities using a noise distribution generated by the reconstructor without receiving a noise estimate from an image compressor; and
selecting, for each pixel position in the second decompressed image, a pixel intensity for the pixel position in the first image or a pixel intensity for the pixel position in the second image using a probability distribution that varies over time.

9. A system for reconstructing an electronic image, the system comprising:
an image reconstructor including at least one processor, the image reconstructor including:
an image decompressor for receiving an image compressed using an image compression algorithm and decompressing the image using an image decompression algorithm to produce a decompressed image;
an image quality analyzer for analyzing the decompressed image for blockiness or banding and detecting blockiness or banding in the decompressed image; and
a pixel intensity blurrer/resampler for modifying pixel intensities in the decompressed image by selecting new values for the pixel intensities using a noise distribution generated by the reconstructor without receiving a noise estimate from an image compressor, thereby producing a decompressed image with modified pixel intensities and less blockiness or banding than the decompressed image produced by the decompressor, and outputting the decompressed image with the modified pixel intensities and less blockiness or banding than the decompressed image produced by the decompressor.

10. The system of claim 9 wherein modifying the pixel intensities includes, at the reconstructor, using a parameter representing an amount of noise expected in the pixel intensities to construct the noise distribution.

11. The system of claim 10 wherein the parameter comprises a scale factor representing a number of photons per pixel intensity count and wherein selecting new values for the pixel intensities includes selecting the scale factor to apply to each pixel intensity before sampling from a Poisson distribution separately for red, green, and blue intensities for each pixel and then rescaling the samples by the inverse of the parameter to determine the new pixel intensities.

12. The system of claim 10 wherein the parameter is a width of a Gaussian distribution in pixel intensity counts and wherein selecting new values for the pixel intensities includes sampling pixel intensity counts from the Gaussian distribution and adding or subtracting the pixel intensity counts from the pixel intensities in the decompressed image.

13. The system of claim 10 wherein the parameter is a width of a Gaussian distribution centered around 1 and wherein selecting new values for the pixel intensities includes sampling values from the Gaussian and multiplying sampled values by the pixel intensities in the decompressed image.

14. The system of claim 9 wherein selecting new values for the pixel intensities includes blurring the image using a Gaussian distribution having a width scaled by a parameter representing an expected size of a smallest correctly represented feature in the decompressed image.

15. The system of claim 10 wherein the parameter represents an expected spatial extent of a smallest properly-encoded feature in the image and wherein selecting new values for the pixel intensities sampling the pixel intensities from neighboring pixels using a spatial sampling distribution centered at each pixel and scaled according the parameter.

16. The system of claim 9 wherein:
the image is a first image in a sequence of video frames;
the image reconstructor receives a second image in the sequence of video frames and compressed using the image compression algorithm;
the image decompressor decompresses the second image using the image decompression algorithm;
the pixel intensity blurrer/resampler modifies pixel intensities in the second image selecting new values for the pixel intensities using a noise distribution generated by the reconstructor without receiving a noise estimate from an image compressor; and
the pixel intensity blurrer/resampler selects, for each pixel position in the second image, a pixel intensity for the pixel position in the first image or a pixel intensity for the pixel position in the second image using a probability distribution that varies over time.

17. A non-transitory computer readable medium having stored thereon executable instructions that when executed by a processor of a computer control the computer to perform steps comprising:
at an image reconstructor including a decompressor, a blurrer/resampler, and an image quality analyzer, and at least one processor:
receiving, at the decompressor, an image compressed using an image compression algorithm;
decompressing, by the decompressor, the image using an image decompression algorithm to produce a decompressed image;
analyzing, by the image quality analyzer, the decompressed image for blockiness or banding and detecting blockiness or banding in the decompressed image;
modifying, by the blurrer/resampler, pixel intensities in the decompressed image by selecting new values for the pixel intensities according to a noise distribution generated by the reconstructor without receiving a noise estimate from an image compressor and thereby producing a decompressed image with modified pixel intensities and less blockiness or banding than the decompressed image produced by the decompressor; and
outputting, by the blurrer/resampler, the decompressed image with the modified pixel intensities and less blockiness or banding than the decompressed image produced by the decompressor.

* * * * *